(12) United States Patent
Nishikawa et al.

(10) Patent No.: US 8,852,707 B2
(45) Date of Patent: Oct. 7, 2014

(54) POLYARYLENE SULFIDE RESIN COMPOSITION AND INSERT-MOLDED ARTICLE

(75) Inventors: Raita Nishikawa, Shizuoka (JP); Tatsuya Kanezuka, Shizuoka (JP); Hiroki Arai, Shizuoka (JP); Yoshihito Fukasawa, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 13/513,771

(22) PCT Filed: Dec. 2, 2010

(86) PCT No.: PCT/JP2010/071580
§ 371 (c)(1), (2), (4) Date: Jun. 4, 2012

(87) PCT Pub. No.: WO2011/070968
PCT Pub. Date: Jun. 16, 2011

(65) Prior Publication Data
US 2012/0237714 A1    Sep. 20, 2012

(30) Foreign Application Priority Data
Dec. 10, 2009  (JP) ................................ 2009-280278

(51) Int. Cl.
  C08L 81/02    (2006.01)
  C08L 23/02    (2006.01)
  B29C 45/00    (2006.01)
  B29C 45/14    (2006.01)

(52) U.S. Cl.
  CPC ............. B29C 45/14 (2013.01); C08L 23/02 (2013.01); C08L 81/02 (2013.01); B29C 45/0001 (2013.01)
  USPC ............ 428/68; 264/279; 525/189; 428/418; 428/419

(58) Field of Classification Search
  None
  See application file for complete search history.

(56) References Cited

U.S. PATENT DOCUMENTS 4,810,590 A * 3/1989 Rich .............................. 428/626
4,831,112 A * 5/1989 Kobayashi et al. ............ 528/388

(Continued)

FOREIGN PATENT DOCUMENTS

JP    10-279802 A    10/1998
JP    2000-263586 A    9/2000

(Continued)

OTHER PUBLICATIONS

Matsuo et al., Machine Translation of JP-2008-214383-A, Sep. 18, 2008, from AIPN http://dossier1.ipdl.inpit.go.jp/AIPN/odse_top_dn.ipdl?N0000=7400.*

(Continued)

Primary Examiner — Callie Shosho
Assistant Examiner — Daniel D Lowrey
(74) Attorney, Agent, or Firm — Hoffmann & Baron, LLP

(57) ABSTRACT

Provided is a PAS resin composition with which molded articles having excellent high- and low-temperature impact properties can be obtained and which can be highly inhibited from leaving mold deposits when molded and is suitable for use in insert molding. Also provided is an insert-molded article obtained using the resin composition. The PAS-derived resin composition comprises a PAS resin having carboxylic terminal groups and an olefin-derived copolymer, wherein the olefin-derived copolymer comprises units of an $\alpha$-olefin, a glycidyl ester of an $\alpha,\beta$-unsaturated acid, and an acrylic ester as comonomer units, the PAS resin has a number average molecular weight of 1,000-10,000, and the content of the comonomer units derived from the glycidyl ester in the resin composition is 0.08-0.20 mass %, the ratio of the content of the comonomer units derived from the glycidyl ester (mmol/kg) to the amount of the carboxylic terminal groups (mmol/kg) being 0.35-1.00.

5 Claims, 1 Drawing Sheet

(56) References Cited

U.S. PATENT DOCUMENTS 5,723,542 A * 3/1998 Hwang et al. ............. 525/92 J
2009/0142566 A1 * 6/2009 Machida et al. ............. 428/220

FOREIGN PATENT DOCUMENTS

| | | |
|---|---|---|
| JP | 2000-309706 A | 11/2000 |
| JP | 2001-31867 A | 2/2001 |
| JP | 2002-179914 A | 6/2002 |
| JP | 2003-176410 A | 6/2003 |
| JP | 2005-60454 A | 3/2005 |
| JP | 2005-161693 A | 6/2005 |
| JP | 2006-1955 A | 1/2006 |
| JP | 2008-75049 A | 4/2008 |
| JP | 2008-144002 A | 6/2008 |
| JP | 2008-207547 A | 9/2008 |
| JP | 2008-214383 A | 9/2008 |
| WO | 2009088092 A1 | 7/2009 |

OTHER PUBLICATIONS

Ishio et al., Machine Translation of JP2001-031867, Jun. 2, 2001.*
Extended European Search Report issued to EP Application No. 10835889.6, mailed Mar. 17, 2014.

* cited by examiner

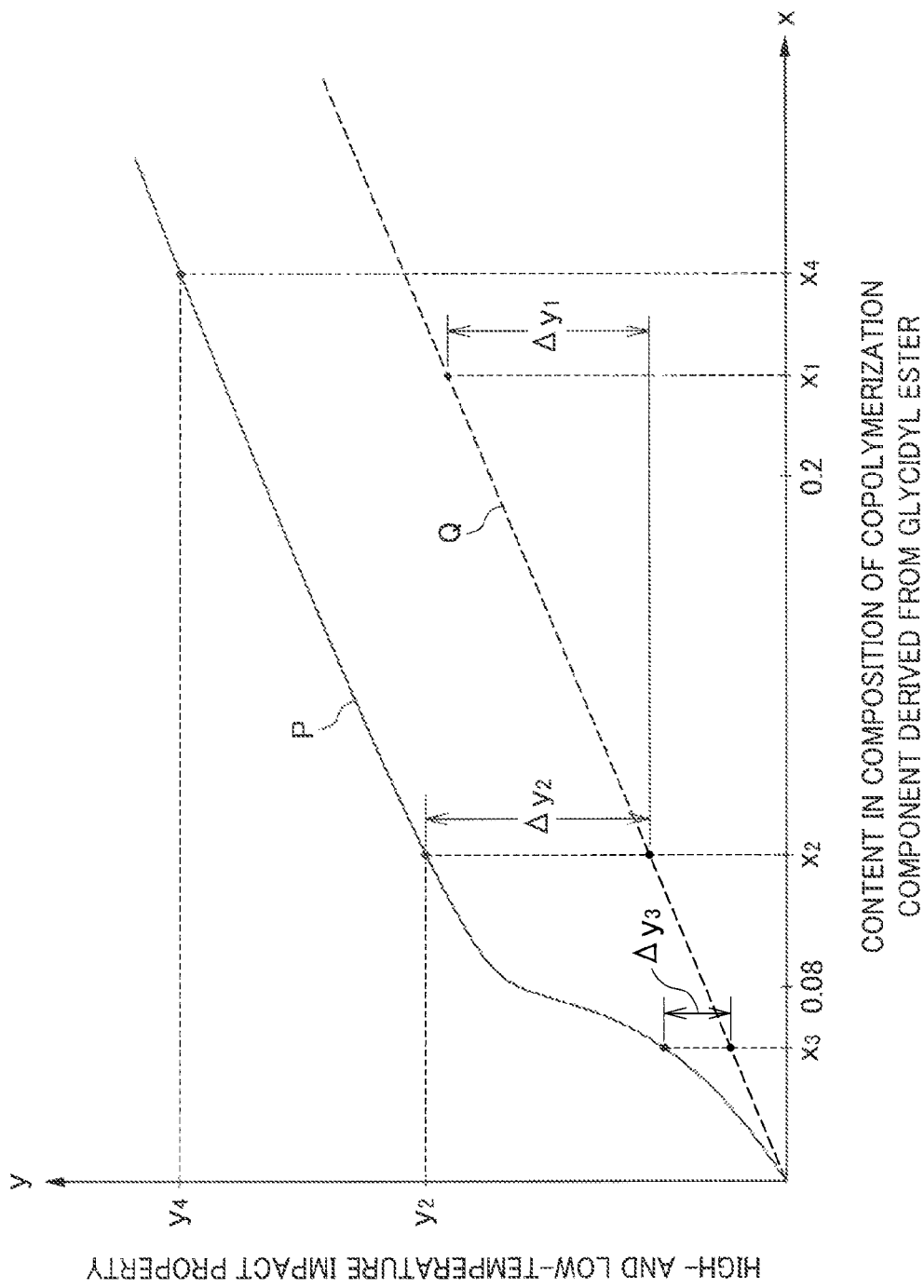

POLYARYLENE SULFIDE RESIN COMPOSITION AND INSERT-MOLDED ARTICLE

CROSS-REFERENCE TO RELATED APPLICATIONS

This application is the National Stage of International Application No. PCT/JP2010/071580, filed Dec. 2, 2010, which claims the benefit of Japanese Application No. 2009-280278, filed Dec. 10, 2009, the entire contents of both of which are incorporated by reference herein.

FIELD OF THE INVENTION

The present invention relates to a polyarylene sulfide-derived resin composition and an insert molded article made by integrally combining the polyarylene sulfide-derived resin composition with an insert member by insert molding.

BACKGROUND OF THE INVENTION

Polyarylene sulfide (hereinafter abbreviated as "PAS") resin, represented by polyphenylene sulfide (hereinafter abbreviated as "PPS") resin, is excellent in heat resistance, mechanical properties, chemical resistance, dimensional stability, and flame resistance. Therefore, the PAS resin has been widely used as a material for parts of electrical or electronic devices, a material for parts of vehicle devices, a material for parts of chemical devices, etc., in particular for applications under high temperatures in usage environment.

Considerable percentage of the PAS resin-containing molded articles utilized in a variety of fields as mentioned above is accounted for by those made by insert molding. The insert molding method is a molding method in which metals or inorganic solids and the like (hereinafter, occasionally abbreviated as "metals and the like") are embedded in resins while making the most of the properties of the resins and the material properties of the metals and the like.

The resins and the metals and the like differ extremely in their rates of expansion or contraction due to temperature change (so-called coefficient of linear thermal expansion). As a result, if a resin portion of the molded articles is thin, the molded article frequently cracks due to the temperature change immediately after the molding or during use, especially in the case where the metals and the like have a sharp corner, and the like.

Recently, resins have also been employed in components located around an engine of vehicles. Since the temperature change is large around the engine of the vehicles, resin compositions having more excellent high- and low-temperature impact property are required.

As a resin composition possessing superior high- and low-temperature impact property, there are known a resin composition in which an olefin-derived copolymer containing an α-olefin and a glycidyl ester of an α,β-unsaturated acid as major components is incorporated into the PAS resin (see, Japanese Unexamined Patent Application, Publication No. 2000-263586), and a resin composition in which an olefin-derived copolymer of ethylene and an α-olefin of at least 5 carbons is incorporated into the PAS resin (see, Japanese Unexamined Patent Application, Publication No. 2002-179914).

When the resin composition described in Japanese Unexamined Patent Application, Publication No. 2000-263586 or 2002-179914 is employed, the high- and low-temperature impact property is improved. However, thermoplastic elastomers including the above-mentioned olefin-derived copolymers are subject to thermal deterioration at elevated temperatures. As result of this drawback, the improvement strategy of the incorporation of the elastomers as described in Japanese Unexamined Patent Application, Publication Nos. 2000-263586 and 2002-179914 gives rise to another problem that a mold deposit (MD) remarkably increases during the molding. Herein, the mold deposit refers to substances adhered to a mold during the molding.

As a method to solve the problem of the mold deposit while allowing the resin composition to retain sufficient high- and low-temperature impact property, there are known a method in which a specific anti oxidant is further incorporated into a PAS resin and a specialized olefin-derived copolymer (see, Japanese Unexamined Patent Application, Publication No. H10-279802), and a method in which a specialized olefin-derived copolymer is incorporated into a PAS resin (see, Japanese Unexamined Patent Application, Publication No. 2006-1955).

[Patent Document 1] Japanese Unexamined Patent Application, Publication No. 2000-263586
[Patent Document 2] Japanese Unexamined Patent Application, Publication No. 2002-179914
[Patent Document 3] Japanese Unexamined Patent Application, Publication No. H10-279802
[Patent Document 4] Japanese Unexamined Patent Application, Publication No. 2006-1955

SUMMARY OF THE INVENTION

Problems to be Solved by the Invention

Japanese Unexamined Patent Application, Publication No. H10-279802 and 2006-1955 disclose that the problem of the mold deposit can be solved while imparting superior high- and low-temperature impact property to the molded articles. However, in regard to the problem of the mold deposit, further improvement has been desired. Specifically, a technology is required which allows for further improvement of the problem of the mold deposit while maintaining the high- and low-temperature impact property at a level comparable to or superior to the conventional one.

In addition, in the case of the insert molded articles in particular, molten resins frequently flow in such a manner that they run around an insert member in a mold, and therefore very high flowability is required for the resin compositions as a raw material. Thus, it is required that the PAS-derived resin compositions not only further improve the problem of the mold deposit while maintaining the high- and low-temperature impact property at a level comparable to or superior to conventional one, but also have flowability suitable for the insert molding.

The present invention has been developed for solving the above problems. An object of the present invention is to provide a PAS-derived resin composition that is suitable for insert molding, is capable of imparting superior high- and low-temperature impact strength to a molded article, and can significantly reduce the generation of the mold deposit during the molding, and an insert molded article using the same.

Means for Solving the Problems

The present inventors have pursued intensive studies for the purpose of solving the problems. Consequently, the present inventors have found that in an olefin-derived copolymer containing an α-olefin and a glycidyl ester of an α,β-unsaturated acid as copolymerization components, the content of the copolymerization component derived from the glycidyl ester of the α,β-unsaturated acid present in the copolymer is high, the high- and low-temperature impact property is high, but the amount of the mold deposit generated during the molding is large, and in addition, that if the olefin-derived copolymer contains a specific copolymerization component such as a repeating unit derived from an acrylic ester, the high- and low-temperature impact property can be improved even when the content of the copolymerization component derived from the glycidyl ester is reduced, to accomplish the present invention. More particularly, the present invention provides the following.

In a first aspect of the present invention, a polyarylene sulfide-derived resin composition comprising a polyarylene sulfide resin having a carboxylic terminal group, and an olefin-derived copolymer is provided, in which the olefin-derived copolymer contains an α-olefin, a glycidyl ester of an α,β-unsaturated acid and an acrylic ester as copolymerization components, number average molecular weight of the polyarylene sulfide resin is at least 1,000 and no more than 10,000, content in the resin composition of a copolymerization component derived from the glycidyl ester is at least 0.08% by mass and no more than 0.20% by mass, and a ratio of an amount of the carboxylic terminal group (mmol/kg) to the content of the copolymerization component (mmol/kg) derived from the glycidyl ester is at least 0.35 and no more than 1.00.

In a second aspect of the present invention, the polyarylene sulfide-derived resin composition according to the first aspect is provided, in which the content in the resin composition of a copolymerization component derived from the α-olefin is at least 2% by mass.

A third aspect of the polyarylene sulfide-derived resin composition according to the first or second aspect of the present invention, further comprising an inorganic filler.

In a fourth aspect of the present invention, provided is an insert molded article made by integrally combining the polyarylene sulfide-derived resin composition according to any one of the first to third aspects with an insert member by insert molding.

In a fifth aspect of the present invention, the insert molded article according to the fourth aspect is provided, in which the insert member is a metal.

Effects of the Invention

By using the PAS-derived resin composition according to the present invention, generation of mold deposit during the molding can be significantly reduced, and simultaneously superior high- and low-temperature impact property can be imparted to the resultant molded articles.

Furthermore, in the present invention, number-average molecular weight of the PAS resin is adjusted within a specific range, and a ratio of the amount of the carboxylic terminal group (mmol/kg) to the content of the copolymerization component (mmol/kg) derived from the glycidyl ester in the PAS resin is also adjusted within a specific range, to increase the flowability of the resin composition and improve its moldability.

BRIEF DESCRIPTION OF THE DRAWINGS

FIG. 1 is a diagram showing a relationship between the high- and low-temperature impact property and the content in a resin composition of the copolymerization component derived from the glycidyl ester.

DETAILED DESCRIPTION OF THE INVENTION

Hereinbelow, an embodiment of the present invention will be described in detail; however, the present invention is in no way limited thereto, and can be implemented with modifications as appropriate within the scope of the object of the present invention.
[Polyarylene Sulfide-Derived Resin Composition]

The polyarylene sulfide-derived resin composition (PAS-derived resin composition) according to the present invention contains a polyarylene sulfide resin having a carboxylic terminal group, and an olefin-derived copolymer. First of all, these essential components will be explained below.
[Polyarylene Sulfide Resin]

The polyarylene sulfide-derived resin, contained in the resin composition, mainly comprises —(Ar—S)— (Ar=arylene group) as a repeating unit. In the present invention, a PAS resin having a generally known molecular structure can be used.

The arylene group includes, but is not specifically limited to, for example, p-phenylene group, m-phenylene group, o-phenylene group, substituted phenylene group, p,p'-diphenylene sulfone group, p,p'-biphenylene group, p,p'-diphenylene ether group, p,p'-diphenylene carbonyl group, and naphthalene group. Among arylene sulfide groups having the arylene groups, preference is given to a homopolymer using the same repeating units, as well as a polymer comprising repeating units having different arylene sulfide groups, depending on the application.

A homopolymer having a repeating unit of p-phenylene sulfide groups as the arylene group is preferable as the homopolymer, although depending on the application. This is because the homopolymer with the p-phenylene sulfide group as the repeating unit has very high heat resistance, and exhibits high strength, high stiffness and high dimensional stability over a wide temperature range. Molded articles with very excellent properties can be obtained by using the homopolymer.

Among arylene sulfide groups having the arylene group, a combination of at least two different arylene sulfide groups can be polymerized to form a copolymer. Among these, a combination of p-phenylene sulfide group with m-phenylene sulfide group is preferably used in view of obtaining molded articles with excellent properties in terms of heat resistance, moldability, mechanical property, etc. It is desirable for the polymer to comprise at least 70 mol % of the p-phenylene sulfide group, more preferably at least 80 mol % of the p-phenylene sulfide group. It should be noted that the PAS resin having phenylene sulfide groups is a PPS (polyphenylene sulfide) resin.

The PAS resin can be manufactured by conventionally known polymerization methods. Typically, to remove co-produced impurities and the like, the PAS resin is washed several times with water or acetone, and then with acetic acid, ammonium chloride, and the like. Consequently, the PAS resin contains a certain amount of carboxylic terminal groups in its resin terminals.

As described hereinbelow, in the present invention, an amount of the carboxylic terminal group of the PAS resin must be adjusted within a specific range relative to the content of the copolymerization component derived from the glycidyl ester of the α,β-unsaturated acid. In the present invention, an amount of the carboxylic terminal group obtained by the method described in the Examples is employed as the amount of the carboxylic terminal group.

The number-average molecular weight of the PAS resin used in the present invention is at least 1,000 and no more than 10,000. When the number-average molecular weight of the PAS resin is set to no more than 10,000, the PAS-derived resin composition tends to have high flowability in a molten state when filled into a mold. Consequently, the molten resin can easily run around an insert member in a mold. By setting the number-average molecular weight to at least 1,000, the mechanical strength and moldability of the PAS resin are ensured. More preferably, the range of the number-average molecular weight is at least 4,000 and no more than 9,000. It should be noted that values of the number-average molecular weight used herein are those obtained by the measurement using the method described in the Examples.

[Olefin-Derived Copolymer]

The olefin-derived copolymer contains an α-olefin, a glycidyl ester of an α,β-unsaturated acid, and an acrylic ester as copolymerization components. First, the essential copolymerization components will be explained.

In the present invention, conventionally known α-olefins can be used, without limitation, as the α-olefin. For example, employable α-olefins include ethylene, propylene, and butylene, etc. Among these α-olefins, ethylene is especially preferred. Combination of at least two of the α-olefins can be used as well.

Inclusion of the α-olefin as the copolymerization component imparts flexibility to the resultant molded articles. Pliableness of the molded articles due to the impartation of the flexibility, in turn, contributes to the improvement of the high- and low-temperature impact property.

In the resin composition according to the present invention, the content in the resin composition of the copolymerization component derived from the α-olefin is preferably at least 2% by mass. By incorporating the copolymerization component derived from the α-olefin in an amount of at least 2% by mass in the resin composition according to the present invention, sufficient flexibility can be imparted to the molded articles, which leads to the improvement of the high- and low-temperature impact property.

The glycidyl ester of the α,β-unsaturated acid refers to a component represented by the general formula (1) below:

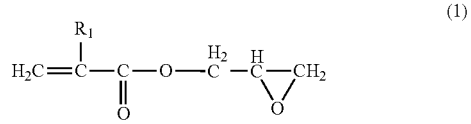

(1)

in which $R_1$ represents hydrogen or a lower alkyl group.

The compounds represented by the general formula (1) include acrylic acid glycidyl ester, methacrylic acid glycidyl ester, ethacrylic acid glycidyl ester, and the like. In the present invention, methacrylic acid glycidyl ester is preferably used.

By incorporating the glycidyl ester of the α,β-unsaturated acid as the copolymerization component, the effect of the improvement the high- and low-temperature impact property can be achieved. On the other hand, when the content of the copolymerization component derived from the glycidyl ester becomes higher, the problem of the mold deposit becomes significant. Conventionally, a cause of the mold deposit has been considered to be thermal deterioration of thermoplastic elastomers such as olefin-derived copolymers at elevated temperatures. However, in the case of the olefin-derived copolymers containing the α-olefin and the glycidyl ester of the α,β-unsaturated acid as the copolymerization components, the problem of the mold deposit can be suppressed by abating the amount of the glycidyl ester of the α,β-unsaturated acid used, even when the olefin-derived copolymer is employed. In addition, as described hereinbelow, by using a specific amount of a specific copolymerization component, and adjusting the amount of the PAS-derived resin used and the amount of the olefin-derived copolymer used, the problem of the mold deposit can also be solved, while realizing superior high- and low-temperature impact property.

In the resin composition according to the present invention, the content in the resin composition of the copolymerization component derived from the glycidyl ester of the α,β-unsaturated acid is at least 0.08% by mass and no more than 0.20% by mass. If the content of the copolymerization component derived from the glycidyl ester of the α,β-unsaturated acid is at least 0.08% by mass, sufficient high- and low-temperature impact property can be imparted to the molded article even when decreasing the content of the copolymerization component derived from the glycidyl ester in order to suppress the problem of the mold deposit. If the content of the copolymerization component derived from the glycidyl ester of the α,β-unsaturated acid is no more than 0.20% by mass, the problem of the mold deposit can be suppressed even when improving the high- and low-temperature impact property by virtue of the copolymerization component derived from the glycidyl ester.

The glycidyl groups present in the copolymerization component derived from the glycidyl ester react with carboxylic terminal groups of the PAS-based resin. It is presumed that this reaction enhances the interaction between the PPS and the olefin-derived copolymers, to improve the high- and low-temperature impact property. Herein, if the content of the copolymerization component derived from the glycidyl ester is too high, then the glycidyl groups of the olefin-derived copolymer react with each other. Consequently, the viscosity of the resin increases and the flowability of the resin composition decreases, which renders the resin composition unsuitable for the insert molding. In order to avoid this situation, the ratio of the content of the copolymerization component derived from the glycidyl ester to the amount of the carboxylic terminal group of the PAS-based resin (the content of the glycidyl ester/the amount of the carboxylic terminal group) is required to be adjusted within a specific range, as mentioned above. Specifically, the ratio (the content of the glycidyl ester/the amount of the carboxylic terminal group) is at least 0.35 and no more than 1.00.

Conventionally known acrylic esters can be used herein, without limitation, as the acrylic ester. Employable acrylic esters include, for example, methyl acrylate, ethyl acrylate, n-propyl acrylate, isopropyl acrylate, n-butyl acrylate, n-hexyl acrylate, n-octyl acrylate, etc., as well as methacrylic acid and methacrylic acid esters, for example, methyl methacrylate, ethyl methacrylate, n-propyl methacrylate, isopropyl methacrylate, n-butyl methacrylate, isobutyl methacrylate, n-amyl methacrylate, and n-octyl methacrylate. Among these acrylic esters, in particular, methyl acrylate is preferably used.

In the present invention, the acrylic ester is a component that contributes to the improvement of the high- and low-temperature impact property. The lowering of the high- and low-temperature impact property due to the decrease in the content of the copolymerization component derived from the glycidyl ester is compensated by the contribution of the copolymerization component derived from the acrylic ester and the copolymerization component derived from the α-olefin.

The content of the copolymerization component derived from the acrylic ester present in the olefin-derived copolymer according to the present invention is not specifically limited, but is preferably at least 10% by mass and no more than 40% by mass. The range of the content mentioned above is preferable, since if the content is at least 10% by mass, the high- and low-temperature impact property is superior, and if the content is no more than 40% by mass, the heat resistance of the resin composition is not impaired.

The olefin-derived copolymer used herein can contain other copolymerization components so long as they do not impair the effects of the present invention.

The olefin-derived copolymer used herein can be manufactured by any conventionally known polymerization method.

The content of the olefin-derived copolymer present in the composition according to the present invention is not specifically limited. In the present invention, the content of the olefin-derived copolymer is preferably at least 1% by mass and at least 8% by mass. It should be noted that in the present invention, adjustment of the content of the copolymerization component derived from the glycidyl ester within a specific range, and/or adjustment of the ratio of the content of the copolymerization component derived from the glycidyl ester to the amount of the carboxylic terminal group of the PAS-derived resin (the content of the glycidyl ester/the amount of the carboxylic terminal group) within a specific range are more important than the content of the olefin-derived copolymer per se.

[Inorganic Filler]

An inorganic filler can be incorporated into the resin composition according to the present invention, in order to improve properties such as mechanical strength, heat resistance, dimensional stability (resistance to deformation, or warpage), and electrical properties. As the inorganic filler, fibrous, particulate, and plate-like fillers are employed depending on the intended use. The fibrous fillers include glass fibers, asbestos fibers, carbon fibers, silica fibers, silica alumina fibers, zirconia fibers, boron nitride fibers, boron fibers, and potassium titanate fibers, as well as inorganic fibrous materials including fibrous materials of metals such as stainless steel, aluminum, titanium, copper, and brass. Particularly representative fibrous fillers are glass fibers, or carbon fibers. On the other hand, the particulate fillers include carbon blacks; silicates such as silica, quartz powder, glass beads, glass powder, calcium silicate, aluminum silicate, kaolin, talc, clay, diatomaceous earth, and wollastonite; metal oxides such as iron oxides, titanium oxides, zinc oxides, and alumina; metal carbonates such as calcium carbonate and magnesium carbonate; metal sulfates such as calcium sulfate and barium sulfate; as well as powder of silicon carbide, silicon nitride, boron nitride, and various metals. Furthermore, the plate-like fillers include mica, glass flakes and various metal foils. In the present invention, glass fibers, calcium carbonate, glass beads or combinations thereof is preferably used. It should be noted that these inorganic fillers can be used alone or in a combination of at least two thereof.

The content of the inorganic filler in the resin composition according to the present invention is preferably at least 5% by mass and 80% by mass. In the case of the content being less than 5% by mass, the benefit of the improvement of properties such as mechanical strength and the like tends to be difficult to manifest itself, and in the case of the content being greater than 80% by mass, molding operation will be difficult, and problems in physical properties of the molded articles such as mechanical strength may be raised.

[Other Components]

The PAS-derived resin composition used herein may contain other resins so long as they do not impair the effects of the present invention. Furthermore, the PAS-derived resin composition employed herein also includes a PAS-derived resin composition to which additives are added, such as nucleating agents, carbon blacks, pigments such as inorganic calcination pigments, anti-oxidants, stabilizers, plasticizers, lubricants, mold release agents and flame retardants and the like in order to impart the desired properties to the molded article, and which thereby has desired properties.

[PAS-Derived Resin Composition]

The resin composition according to the present invention can be prepared by any conventionally known method. For example, any method can be used, including a method in which all of the components are blended together, kneaded with an extruder, and then extruded to prepare pellets, a method in which pellets having a different composition are once prepared, and then a predetermined amount of the pellets are blended and subjected to the molding, to yield a molded article of a targeted composition after the molding, and a method in which one or at least two of the components are directly charged into a molding machine, and the like.

The resin composition according to the present invention has flowability suitable for the insert molding. The flowability of the resin composition varies depending on the type of the resin used and a blending quantity, as well as the type and percentage of the copolymerization components (in the case of the resin being a copolymer), and the like; in the present invention, preferable flowability can be realized primarily by adjusting the number-average molecular weight of the PAS resin. As used herein, the preferable flowability of the PAS resin means, for example, a melt index of at least 400 g/10 min and no more than 1,500 g/10 min, as measured under a load of 2,160 g at 315° C.

[Insert Molded Article]

The insert molded article according to the present invention is made by integrally combining the PAS-derived resin composition with an insert member by insert molding. The insert molded article according to the present invention is similar to common insert molded articles except that the PAS-derived resin composition according to the present invention is employed. The common insert molded articles refer to articles molded as a composite molded article by premounting the metals and the like to a mold, and filling the above-mentioned blended resin composition outside the metals and the like in the mold. Molding methods for filling the resin into the mold include an injection molding method, an extrusion-compression molding method and the like; the injection molding method is a standard method. In particular, in the injection molding method, such flowability as in the resin composition according to the present invention is needed.

In addition, the insert member is not limited to a particular insert member; however, an insert member that is neither deformed nor melted upon contacting with the resin in the course of the molding is preferably used, since the insert member is employed for the purpose of making the most of its characteristics and compensating the drawbacks of the resin. For example, insert members that are made of solids including metals such as aluminum, magnesium, copper, iron, brass and alloys thereof, and inorganic solids such as glass and ceramics and are preformed into bars, pins, and clinchers are primarily used. In the present invention, the benefit of the present invention is significantly manifested when the metals are employed. It should be noted that the insert member is not particularly restricted in shape or the like.

The effect exerted by the insert molded article according to the present invention will be explained in reference to FIG. 1. In FIG. 1, the vertical axis represents the high- and low-temperature impact property, and the horizontal axis represents the content in the composition of the copolymerization component derived from the glycidyl ester (occasionally referred to as an amount of the glycidyl ester). The solid line P is a line that represents a relationship between the high- and low-temperature impact property and the amount of the glycidyl ester when employing an olefin-derived copolymer containing an α-olefin, a glycidyl ester of an α,β-unsaturated acid, and an acrylic ester as the copolymerization components. The dashed line Q is a line that represents a relationship between the high- and low-temperature impact property and the amount of the glycidyl ester when employing an olefin-derived copolymer containing an α-olefin and a glycidyl ester of an α,β-unsaturated acid as the copolymerization components.

When the amount of the glycidyl ester is decreased from x1 to x2, the problem of the mold deposit can be drastically improved. This is the effect of suppressing the mold deposit generation. On one hand, the problem of the mold deposit can thus be drastically suppressed; on the other hand, when the amount of the glycidyl ester is simply decreased, the high- and low-temperature impact property decreases by the degree corresponding to $\Delta y1$. However, in the present invention, the high- and low-temperature impact property can be increased by the degree corresponding to $\Delta y2$ by virtue of incorporating a specific amount of the copolymerization component derived from the acrylic ester and the copolymerization component derived from the α-olefin.

When the amount of the glycidyl ester is set to less than 0.08% by mass to improve the mold deposit, and the ratio (the content of the glycidyl ester/the amount of the carboxylic terminal group) is below 0.35, the effects of the improvement of the high- and low-temperature impact property elicited by the glycidyl ester, and the effect of the improvement of the high- and low-temperature impact property elicited by the copolymerization component are both diminished. For example, at x3 in FIG. 1, the effect of the improvement of the high- and low-temperature impact property is exerted, but the effect is very small ($\Delta y2 >> \Delta y3$).

When the amount of the glycidyl ester is set within a range above 0.20% by mass in order to achieve more excellent high- and low-temperature impact property, and the ratio (the content of the glycidyl ester/the amount of the carboxylic terminal group) is above 1.00, the high- and low-temperature impact property is greatly improved. For example, at x4 in FIG. 1, the high- and low-temperature impact property is very high (y4). However, when the amount of the glycidyl component is x4, the problem of the mold deposit becomes prominent.

EXAMPLES

Hereinbelow, the present invention will be further explained in detail with reference to Examples, but it should be understood that the present invention is not limited by the Examples.

[Materials]

PAS resin 1: PPS resin, "W205A" from Kureha Corporation; and

PAS resin 2: PPS resin, "W300" from Kureha Corporation.

The number-average molecular weight of the PAS resins was measured. Specifically, each resin was dissolved in 1-chloronaphthalene as a solvent by heating the resin and 1-chloronaphthalene at 230° C. for 10 min in an oil bath, to prepare a solution having a concentration of 0.05% by mass. High temperature gel permeation chromatography (measurement device; Senshu Scientific Co., SSC-7000, with a UV detector) was performed, and the number-average molecular weight was calculated based on standard polystyrene calibration. The calculation result was 8,000 for the PAS resin 1, and 17,000 for the PAS resin 2. In addition, the melt index was 550 for the PAS resin 1, and 70 for the PAS resin 2.

Olefin-derived copolymer 1 (7L): "Bond Fast 7L" from Sumitomo Chemical Company, Limited;

Olefin-derived copolymer 2 (7M): "Bond Fast 7M" from Sumitomo Chemical Company, Limited;

Olefin-derived copolymer 3 (2C): "Bond Fast 2C" from Sumitomo Chemical Company, Limited;

Olefin-derived copolymer 4 (E): "Bond Fast E" from Sumitomo Chemical Company, Limited; and Olefin-derived copolymer 5 (CG5001): "Bond Fast CG5001" from Sumitomo Chemical Company, Limited.

The olefin-derived copolymers 1 and 2 contain ethylene, methacrylic acid glycidyl ester (GMA), and methyl acrylate (MA) as the copolymerization components. The olefin-derived copolymers 3 to 5 contain ethylene and methacrylic acid glycidyl ester as the copolymerization components. Details of the content ratio of the respective copolymerization components are shown in Table 1.

Inorganic filler 1: glass fiber;
Inorganic filler 2: calcium carbonate; and
Inorganic filler 3: glass beads.

[Resin Composition]

In order to manufacture the above-mentioned PAS resin composition, a PAS resin, an olefin-derived copolymer, and other additives (if necessary) were homogeneously blended in a tumbler mixer, a Henschel mixer or the like, the blended material was melt kneaded in a twin-screw extruder with a cylinder temperature of 320° C., to prepare pellets of the resin compositions according to Examples and Comparative Examples. In addition, of the materials listed in Table 1, the glass fiber, calcium carbonate, and the glass beads were introduced into the extruder via a side feeder, and melt kneaded.

Separately, the melt index of the resin compositions was measured. Specifically, the measurement was performed in accordance with ASTM D-1238, at 315° C. under a load of 2,160 g. The measurement results are shown in Table 1.

The amount of the carboxylic terminal group present in the resin compositions employed in Examples and Comparative Examples was measured by the following method (the following method is exemplified merely by way of an example).

(Measurement of Amount of Carboxylic Terminal Group)

(i) In FT-IR measurement, peak height of an absorption peak at 3065 $cm^{-1}$ due to the benzene ring of benzoic acid and an absorption peak at 1704 $cm^{-1}$ due to its carboxylic group were measured. The values of the peak height were 0.012 and 0.143, respectively. Thus, relative intensity of the absorption peak due to the carboxylic group versus the absorption peak due to the C—H bond of the benzene ring was calculated to be 59.6.

(ii) The resin composition was pressed, and the FT-IR measurement was performed on the pressed resin composition. The values of the peak height (absorption intensity) were 0.072 and 0.003 at 3065 $cm^{-1}$ and 1704 $cm^{-1}$, respectively.

(iii) The relative intensity of the absorption peak due to one carboxylic group versus the absorption peak due to one C—H bond of the benzene ring in the resin composition to be measured was calculated based on their peak height (at 3065 $cm^{-1}$ and 1704 $cm^{-1}$, respectively) in the same manner as described above, to yield a value of 0.15. Based on the relative intensity of the absorption peaks due to benzoic acid, in which the benzene ring is substituted with one carboxylic group, it was determined that the carboxylic group was present in an amount of 0.25 mol % based on the total amount of the benzene ring.

(iv) The amount of the repeating unit —(Ar—S)— (Ar=benzene ring) contained per 1 kg of the resin composition was calculated to be 9.3 mol/kg, and thus, the amount of the carboxylic group contained per 1 kg of the resin composition was calculated to be 23 mmol/kg.

[Insert Molded Article]

The pellets of the resin compositions according to Examples and Comparative Examples were employed, and the insert injection molding was carried out under the condition of resin temperature of 320° C., mold temperature of 150° C., injection time of 40 sec, and cooling time of 60 sec such that the minimum wall thickness of a resin portion surrounding a metallic pin (14 mm×14 mm×24 mm) was 1 mm, to prepare insert molded articles according to Examples and Comparative Examples.

[Evaluation]

The high- and low-temperature impact property and the mold deposit were evaluated on the insert molded articles according to Examples and Comparative Examples.

[High- and Low-temperature Impact Property]

High- and low-temperature impact test, one cycle of which consisted of the steps of heating at 180° C. for 2 hours, subsequent cooling at −40° C. for 2 hours and subsequent heating to 180° C., was performed on the insert molded articles according to Examples and Comparative Examples by using a high low temperature impact testing machine, and the number of cycles until a crack was generated in the molded article was determined, and the high- and low-temperature impact resistance was evaluated. The evaluation criterion herein was as follows: "A", the number of cycles of at least 100; "B", the number of cycles of at least 70 and less than 100; "C", the number of cycles of at least 50 and less than 70; "D", the number of cycles of less than 50. The number of cycles and the results of the evaluation are shown in Table 1.

[Evaluation on Mold Deposit (MD)]

The amount of the substances adhered to the mold was visually evaluated after molding the insert molded articles according to Examples and Comparative Examples. The evaluation criterion herein was as follows: "A", extremely small; "B", small; "C", somewhat large, "D", large. The results of the evaluation are shown in Table 1.

TABLE 1

| | | Examples | | | | | Comparative Examples | |
|---|---|---|---|---|---|---|---|---|
| | | 1 | 2 | 3 | 4 | 5 | 1 | 2 |
| Blending Quantity in Resin Composition | PAS resin 1 (% by mass) | 66 | 64 | 67 | 46 | 37 | 68 | 62 |
| | PAS resin 2 (% by mass) | | | | | | | |
| | glass fiber (% by mass) | 30 | 30 | 30 | 25 | 30 | 30 | 30 |
| | calcium carbonate (% by mass) | | | | 25 | | | |
| | glass beads (% by mass) | | | | | 30 | | |
| | Olefin-derived copolymer (% by mass) | 4 | 6 | 3 | 4 | 3 | 2 | 8 |
| Amount of Respective Components in Olefin-Derived Copolymer | The kind of Olefin-derived copolymer | 7 L | 7 L | 7 M | 7 L | 7 L | 7 L | 7 L |
| | Amount of ethylene (% by mass) | 70 | 70 | 67 | 70 | 70 | 70 | 70 |
| | methacrylic acid glycidyl ester (GMA) (% by mass) | 3 | 3 | 6 | 3 | 3 | 3 | 3 |
| | Amount of methyl acrylate (% by mass) | 27 | 27 | 27 | 27 | 27 | 27 | 27 |
| Amount of ethylene in Resin Composition (% by mass) | | 2.8 | 4.2 | 2.0 | 2.8 | 2.1 | 1.4 | 5.6 |
| Amount of GMA in Resin Composition (% by mass) | | 0.12 | 0.18 | 0.18 | 0.12 | 0.09 | 0.06 | 0.24 |
| Amount of MA in Resin Composition (% by mass) | | 1.08 | 1.62 | 0.81 | 1.08 | 0.81 | 0.54 | 2.16 |
| Amount of the carboxylic terminal group (COOH group) | | 15 | 15 | 15 | 11 | 8 | 16 | 14 |
| Amount of GMA | | 8 | 13 | 13 | 8 | 6 | 4 | 17 |
| ratio (GMA/PPS) | | 0.56 | 0.87 | 0.83 | 0.80 | 0.75 | 0.27 | 1.19 |
| the melt index of the resin compositions | | 370 | 370 | 370 | 370 | 370 | 370 | 370 |
| High- and Low-temperature Impact Property | the number of cycles | 82 | 120 | 80 | 85 | 79 | 40 | 200 |
| | Evaluation | B | A | B | B | B | D | A |
| MD | | B | B | B | B | B | A | C |

| | | Comparative Examples | | | | | | |
|---|---|---|---|---|---|---|---|---|
| | | 3 | 4 | 5 | 6 | 7 | 8 | 9 |
| Blending Quantity in Resin Composition | PAS resin 1 (% by mass) | 66 | 66 | 67 | 66 | 66 | 69 | |
| | PAS resin 2 (% by mass) | | | | | | | 66 |

TABLE 1-continued

|  |  | | | | | | | |
|---|---|---|---|---|---|---|---|---|
|  | glass fiber (% by mass) | 30 | 30 | 30 | 30 | 30 | 30 | 30 |
|  | calcium carbonate (% by mass) | | | | | | | |
|  | glass beads (% by mass) | | | | | | | |
|  | Olefin-derived copolymer (% by mass) | 4 | 4 | 3 | 4 | 4 | 1 | 4 |
| Amount of Respective Components in Olefin-Derived Copolymer | The kind of Olefin-derived copolymer | 7 M | 2C | 2C | E | CG5 001 | CG5 001 | 7 L |
|  | Amount of ethylene (% by mass) | 67 | 94 | 94 | 88 | 81 | 81 | 70 |
|  | methacrylic acid glycidyl ester (GMA) (% by mass) | 6 | 6 | 6 | 12 | 19 | 19 | 3 |
|  | Amount of methyl acrylate (% by mass) | 27 | 0 | 0 | 0 | 0 | 0 | 27 |
| Amount of ethylene in Resin Composition (% by mass) | | 2.7 | 3.8 | 2.8 | 3.5 | 3.2 | 0.8 | 2.8 |
| Amount of GMA in Resin Composition (% by mass) | | 0.24 | 0.24 | 0.18 | 0.48 | 0.76 | 0.19 | 0.12 |
| Amount of MA in Resin Composition (% by mass) | | 1.08 | 0 | 0 | 0 | 0 | 0 | 1.08 |
| Amount of the carboxylic terminal group (COOH group) | | 15 | 15 | 15 | 15 | 15 | 16 | 13 |
| Amount of GMA | | 17 | 17 | 13 | 34 | 54 | 13 | 8 |
| ratio (GMA/PPS) | | 1.12 | 1.12 | 0.83 | 2.24 | 3.55 | 0.85 | 0.64 |
| the melt index of the resin compositions | | 370 | 370 | 370 | 370 | 370 | 370 | 70 |
| High- and Low-temperature Impact | the number of cycles | 106 | 42 | 31 | 67 | 79 | 20 | inability to mold |
| Property | Evaluation | A | D | D | C | B | D | D |
| MD | | C | C | B | D | D | B | B |

As is evident from the results of Examples 1 to 5, it was confirmed that the insert molded articles made by using the PAS resin composition according to the present invention only marginally bring about the problem of the mold deposit and is superior in high- and low-temperature impact property.

In Comparative Examples 4 to 7, the content in the composition of the copolymerization component derived from the glycidyl ester of the α,β-unsaturated acid increases in the following order: Comparative Example 5, 4, 6, and 7. It was confirmed that the higher the content of the copolymerization component derived from the glycidyl ester is, the more significant the problem of the mold deposit is. In contrast, it was confirmed that the lower the content of the copolymerization component derived from the glycidyl ester, the more the problem of the mold deposit is suppressed. From the results of these Comparative Examples, it was confirmed that in the case of the olefin-derived copolymer containing the α-olefin and the glycidyl ester of the α,β-unsaturated acid as the copolymerization components, the content of the copolymerization component derived from the glycidyl ester of the α,β-unsaturated acid is correlated with the amount if the mold deposit and the high- and low-temperature impact property. It should be noted that the behaviors exhibited by those insert molded articles according to Comparative Examples 4 to 7 have the same tendency as the dashed line Q in FIG. 1.

In Examples 1, 2, 4, and 5 and Comparative Examples 1 and 2, the content of the copolymerization component derived from the glycidyl ester of the α,β-unsaturated acid increases in the following order: Comparative Example 1, Example 5, Examples 1 and 4, Example 2, and Comparative Example 2. It was confirmed that by incorporating the α-olefin and the acrylic ester as the copolymerization component, the high- and low-temperature impact property was high even when the content of the copolymerization component derived from the glycidyl ester of the α,β-unsaturated acid is abated. The behaviors exhibited by those insert molded articles according to Examples 1, 2, 4, and 5 and Comparative Examples 1 and 2 have the same tendency as the solid line P in FIG. 1.

As is evident from the results of Comparative Example 1 and Example 5, if the content of the copolymerization component derived from the glycidyl ester exceeds about 0.08% by mass, the high- and low-temperature impact property steeply increases.

Furthermore, as is evident from the results of Comparative Example 1 and Example 1, if the ratio (the content of the glycidyl ester/the amount of the carboxylic terminal group) exceeds about 0.35, the high- and low-temperature impact property steeply increases.

As is evident from the results of Examples 2 and 3 and Comparative Example 2, if the content of the copolymerization component derived from the glycidyl ester exceeds about 0.20% by mass and the ratio (the content of the glycidyl ester/the amount of the carboxylic terminal group) exceeds about 1.00, the problem of the mold deposit becomes significant.

The invention claimed is:

1. A polyarylene sulfide-derived resin composition comprising a polyarylene sulfide resin having a carboxylic terminal group, and an olefin-derived copolymer, wherein:
   the olefin-derived copolymer contains a repeating unit derived from an α-olefin, a repeating unit derived from a glycidyl ester of an α,β-unsaturated acid, and a repeating unit derived from an acrylic ester,
   number average molecular weight of the polyarylene sulfide resin is at least 4,000 and no more than 10,000, the repeating unit derived from the glycidyl ester is present in the resin composition in an amount of at least 0.08% by mass and no more than 0.20% by mass, and a ratio of the amount of the repeating unit (mmol/kg) derived from the glycidyl ester to an amount of the carboxylic terminal group (mmol/kg) is at least 0.35 and no more than 1.00.

2. The polyarylene sulfide-derived resin composition according to claim 1, wherein the repeating unit derived from the α-olefin is present in the resin composition in an amount of at least 2% by mass.

3. The polyarylene sulfide-derived resin composition according to claim 1, further comprising an inorganic filler.

4. An insert molded article made by integrally combining the polyarylene sulfide-derived resin composition according to claim 1 with an insert member by insert molding.

5. The insert molded article according to claim 4, wherein the insert member is a metal.

* * * * *